March 18, 1952   F. W. MARSH   2,589,716
VALVE CONSTRUCTION
Filed Jan. 31, 1946

INVENTOR.
Frederick W. Marsh.
BY Walter C. Ross
Attorney

Patented Mar. 18, 1952

2,589,716

UNITED STATES PATENT OFFICE 2,589,716

VALVE CONSTRUCTION

Frederick W. Marsh, Springfield, Mass., assignor to Kestral Corporation, Springfield, Mass., a corporation of Massachusetts Application January 31, 1946, Serial No. 644,500

2 Claims. (Cl. 251—119)

1

This invention relates to improvements in valve means and is directed more particularly to valve construction adapted for use with inflatable articles.

The principal objects of the invention are the provision of a valve construction for inflatable objects which have at least one wall made from pliable and more or less elastic material. The valve construction of the invention is characterized by its simplicity whereby to facilitate economy in manufacture while at the same time it is efficient in operation.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
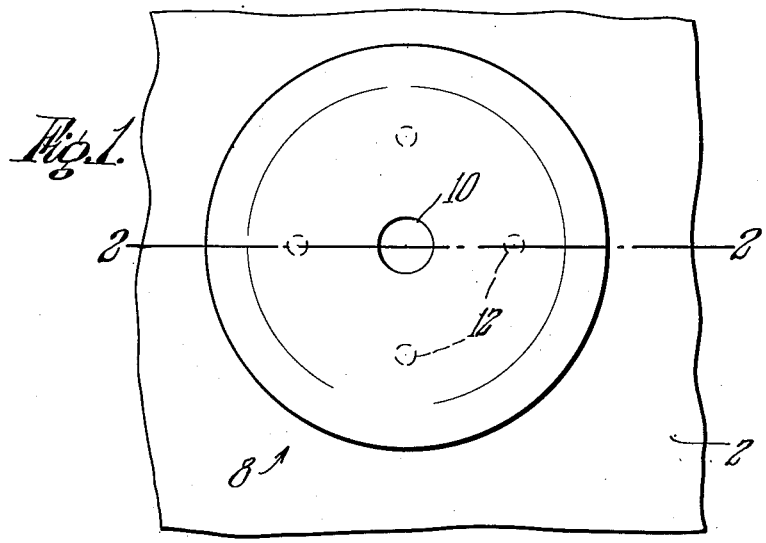
Fig. 1 is a plan view of the valve construction of the invention associated with a wall of an inflatable object.
Figure 2:
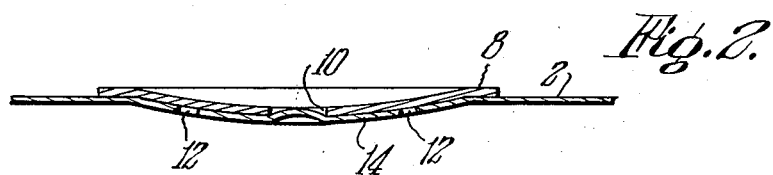
Fig. 2 is a sectional view on the line 2—2 of Fig. 1.

Referring now to the drawings more in detail, the invention will be fully described.

Figure 3:
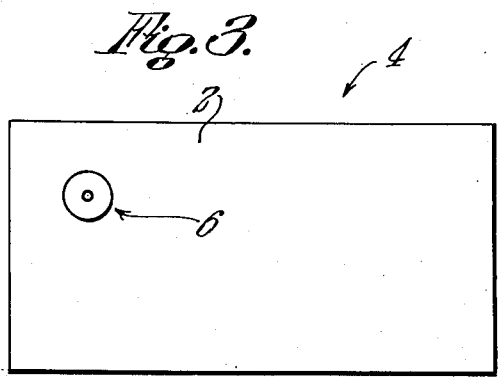
Fig. 3 is a plan view of an inflatable article having the novel features of the invention associated therewith.

A wall of an inflatable article is represented by 2 and said article may be any one of numerous objects such as a pillow, cushion, mattress or the like. An object 4 is shown in Fig. 3 which may be a pillow or the like and the valve construction is represented by 6.

Inflatable articles are made from various materials which have the desired and necessary pliability and are more or less elastic and stretchable. Therefor, the wall 2 may be made from rubber, rubber composition, plastic such as "Vinylite," "Koroseal," or the like.

A plate member 8 is provided which will be made from relatively rigid or stiff material, that is material which is more rigid than that of the wall 2. For this purpose, various materials may be employed such as certain forms of plastic, nitrocellulose, cellulose acetate, Vinylite, hard rubber, or the like.

The member 8 is provided with a central opening 10 and it is secured at marginal edge portions to the wall 2 in such a manner as to be bonded thereto in a secure manner. Made from

2 various plastics, the member 8 may be secured to the wall by heat, welding, fusing, cement or in any desired and suitable manner, depending on the material used.

A plurality of smaller openings 12 are provided in the wall beneath the member 8 and are disposed between the central opening 10 and the point of attachment of the said member 8 to the wall 2.

The portion 14 of the wall 2 within the zone of the member 8 functions as a flexible or elastic diaphragm or valve member movable towards and away from said member 8.

In operation air is forced into and through the opening 10 of the member 8 so that it forces the diaphragm 14 away from said member and flows between the diaphragm and member and through openings 12. With wall 2 forming a part of an inflatable article air is thus supplied thereto and the article is inflated.

When the diaphragm is relieved of air pressure, the pressure within the inflated article acts to press the diaphragm against the member 8 and seal the opening 10 and prevent the escape of air. As shown, the portion of the diaphragm may enter the opening 10 for the sealing function while the diaphragm is pressed against the member 10 between and around the openings.

Air may be forced into the article by blowing into the opening 10 but where a large inflatable article requires a large volume of air, the member 8 may be provided with means for connecting to an air supply such as air pump, air line or the like.

The member 8 is shown as being dished which may be desirable in some cases but in other cases a flat member will be adequate.

The opening 10 will be preferably small in diameter to eliminate the possibility of an object such as the tip of a finger pressing the diaphragm inwardly to allow air to escape.

The openings 12 are preferably smaller than the opening 10 and they are disposed between the opening 10 and point of attachment of the member 8 and wall 2 to provide a tight seal between the diaphragm and wall around the openings.

In a typical case the member 8 has been about one and one-half inch in diameter with the opening 10 about one-quarter of an inch in diameter but it is not desired to be limited thereto.

An article may be deflated by pressing the diaphragm inwardly so that air may flow through the openings 12, between the diaphragm and member 8 and out opening 10.

The construction is simple in form, is not bulky and may be used in connection with various inflatable objects having a wall which is pliable and elastic.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A valve construction for an inflatable article having a wall member of substantially uniform thickness formed of a flexible, elastically expansible material comprising in combination a convex plate member substantially inflexible relative to the wall member and of substantially uniform thickness throughout secured around its peripheral edge portion only, to the outer face of the wall member in such a manner that said wall is stretched over the convex face of said plate, the portion of the wall member within said secured peripheral edge portion being free from attachment to the plate member, said plate member being formed with an opening positioned inwardly from its secured peripheral edge portion, the edges of said opening being flush with the faces of the plate member, the portion of the wall opposite said opening being expansible thereinto to seal the opening in the presence of an inflating pressure within the article, the portion of the wall member within said secured peripheral edge portion of the plate member being provided with an opening offset from said opening in the plate member, the edges of said wall opening being flush with the faces of the wall and being normally closed by face to face over-all engagement of the wall and plate member in the presence of an inflating pressure within the article, the portion of the wall within said secured peripheral edge portion of the plate member being movable inwardly away from the plate member by inwardly directed pressure through said plate opening to establish an article inflating and deflating communication between said openings.

2. A valve construction for an inflatable article having a wall member of substantially uniform thickness formed of flexible, elastically expansible vinyl sheeting comprising in combination a convex vinyl plastic disc substantially inflexible relative to the wall member and of substantially uniform thickness throughout, welded, around its peripheral edge portion only, to the outer face of the wall member in such a manner that said wall is stretched over the convex face of said plate, the portion of the wall member within said secured peripheral edge portion being free from attachment to the disc, said disc being formed with a central opening, the edges of said opening being flush with the faces of the disc, the portion of the wall opposite said opening being expansible thereinto to seal the opening in the presence of an inflating pressure within the article, the portion of the wall member within said secured peripheral edge portion of the disc being provided with an opening offset from said opening in the disc, the edges of said wall opening being flush with the faces of the wall and being normally closed by a face to face over-all engagement of the wall and disc in the presence of an inflating pressure within the article, the portion of the wall within said secured peripheral edge portion of the disc being movable inwardly away from the disc by inwardly directed pressure through said disc opening to establish an article inflating and deflating communication between said openings.

FREDERICK W. MARSH.

REFERENCES CITED

The following references are of record in the file of this patent:

UNITED STATES PATENTS

| Number | Name | Date |
|---|---|---|
| 584,478 | MacSpadden | June 15, 1897 |
| 1,702,981 | Reach | Feb. 19, 1929 |
| 1,910,961 | Perry | May 23, 1933 |
| 2,133,575 | Rosenberg | Oct. 18, 1938 |